(12) United States Patent
Bodake

(10) Patent No.: US 9,551,591 B2
(45) Date of Patent: Jan. 24, 2017

(54) DRIVING ASSISTANCE BASED ON ROAD INFRASTRUCTURE INFORMATION

(71) Applicant: Verizon Patent and Licensing Inc., Arlington, VA (US)

(72) Inventor: Ramesh Kashinath Bodake, Milton, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 43 days.

(21) Appl. No.: 14/636,526

(22) Filed: Mar. 3, 2015

(65) Prior Publication Data

US 2016/0258777 A1    Sep. 8, 2016

(51) Int. Cl.
| | | |
|---|---|---|
| *G01C 21/30* | (2006.01) | |
| *G01C 21/32* | (2006.01) | |
| *G01C 21/36* | (2006.01) | |
| *G06F 3/0481* | (2013.01) | |

(52) U.S. Cl.
CPC ......... *G01C 21/367* (2013.01); *G01C 21/3691* (2013.01); *G06F 3/04817* (2013.01)

(58) Field of Classification Search
CPC ... G01C 21/367; G01C 21/3691; G01C 21/32; G01C 21/3647; G01C 21/3667; G06F 3/04817; G09B 29/10; G09B 29/007
USPC .................................................... 701/1, 439
See application file for complete search history.

(56) References Cited

U.S. PATENT DOCUMENTS

| | | | | |
|---|---|---|---|---|
| 7,629,899 B2* | 12/2009 | Breed | ................... | B60N 2/2863 340/435 |
| 8,725,396 B2* | 5/2014 | Gueziec | ............... | G08G 1/0112 701/117 |
| 2004/0059501 A1* | 3/2004 | Ikeda | ............... | G08G 1/096716 701/431 |
| 2005/0280520 A1* | 12/2005 | Kubo | .................... | B60Q 9/008 340/435 |
| 2011/0182475 A1* | 7/2011 | Fairfield | ............ | G06K 9/00825 382/104 |
| 2014/0129121 A1* | 5/2014 | Fino | ........................ | G01C 21/34 701/117 |
| 2014/0266800 A1* | 9/2014 | Koukoumidis | ........ | G08G 1/141 340/932.2 |

(Continued)

*Primary Examiner* — Jaime Figueroa

(57) ABSTRACT

A user equipment (UE) provides driving assistance based on road infrastructure information. The UE may include a wireless interface which communicates over a wireless channel, a position determination system configured to determine a position of the UE, a memory configured to store instructions, and a processor configured to execute the instructions stored in the memory. The processor may be configured to transmit a request for road infrastructure data which may include the position of the UE, receive road infrastructure data associated with road infrastructure element(s) within a proximity to the UE, where a boundary of the proximity exceeds a line of sight of the UE. The processor may also generate a graphical representation of the road infrastructure element(s) along with information associated with the road infrastructure data, and provide the graphical representation to a display. The graphical representation may convey status of, or information provided by, the road infrastructure element(s).

20 Claims, 8 Drawing Sheets

(56) References Cited

U.S. PATENT DOCUMENTS

| | | | |
|---|---|---|---|
| 2015/0179088 A1* | 6/2015 | Raman | G09B 21/001 348/62 |
| 2015/0210312 A1* | 7/2015 | Stein | B60W 30/00 701/41 |
| 2015/0310738 A1* | 10/2015 | Karacan | G08G 1/0112 701/117 |
| 2015/0310739 A1* | 10/2015 | Beaurepaire | G08G 1/0141 701/117 |

* cited by examiner

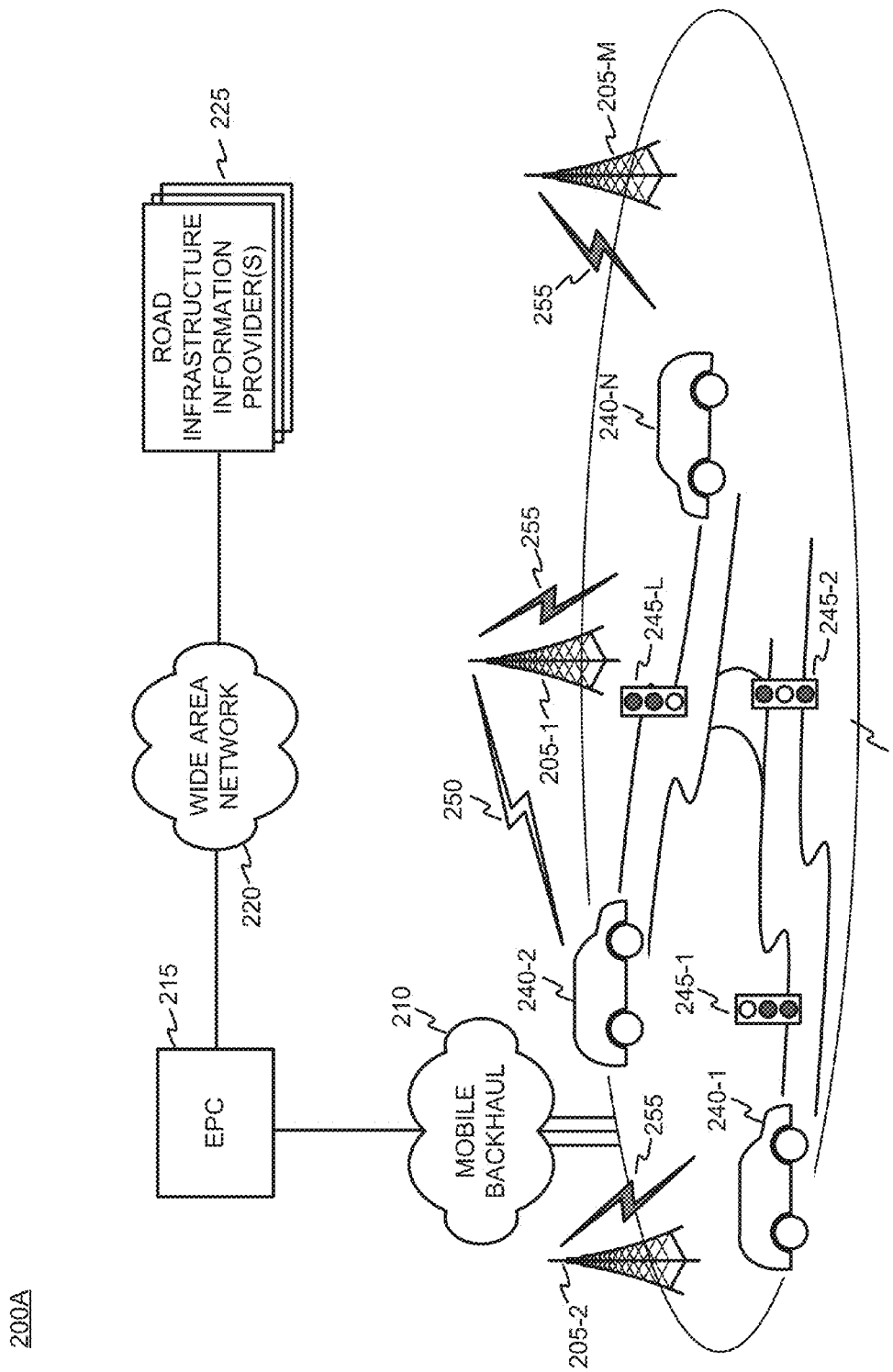

DRIVING ASSISTANCE BASED ON ROAD INFRASTRUCTURE INFORMATION

BACKGROUND

Mobile wireless devices have traditionally included some form of position determination capability to assist users with navigational tasks. More recent developments include social navigation techniques which further leverage wireless communications networks to supplement position data with additional information provided by other users within the networks. However, the navigation information conventionally received by mobile devices does not include timely information directly reflecting the status of road infrastructure elements, such as traffic signals.

BRIEF DESCRIPTION OF THE DRAWINGS

FIGS. 2A and 2B are diagrams showing exemplary systems for providing road infrastructure information;

DETAILED DESCRIPTION OF THE PREFERRED EMBODIMENTS

Figure 1:
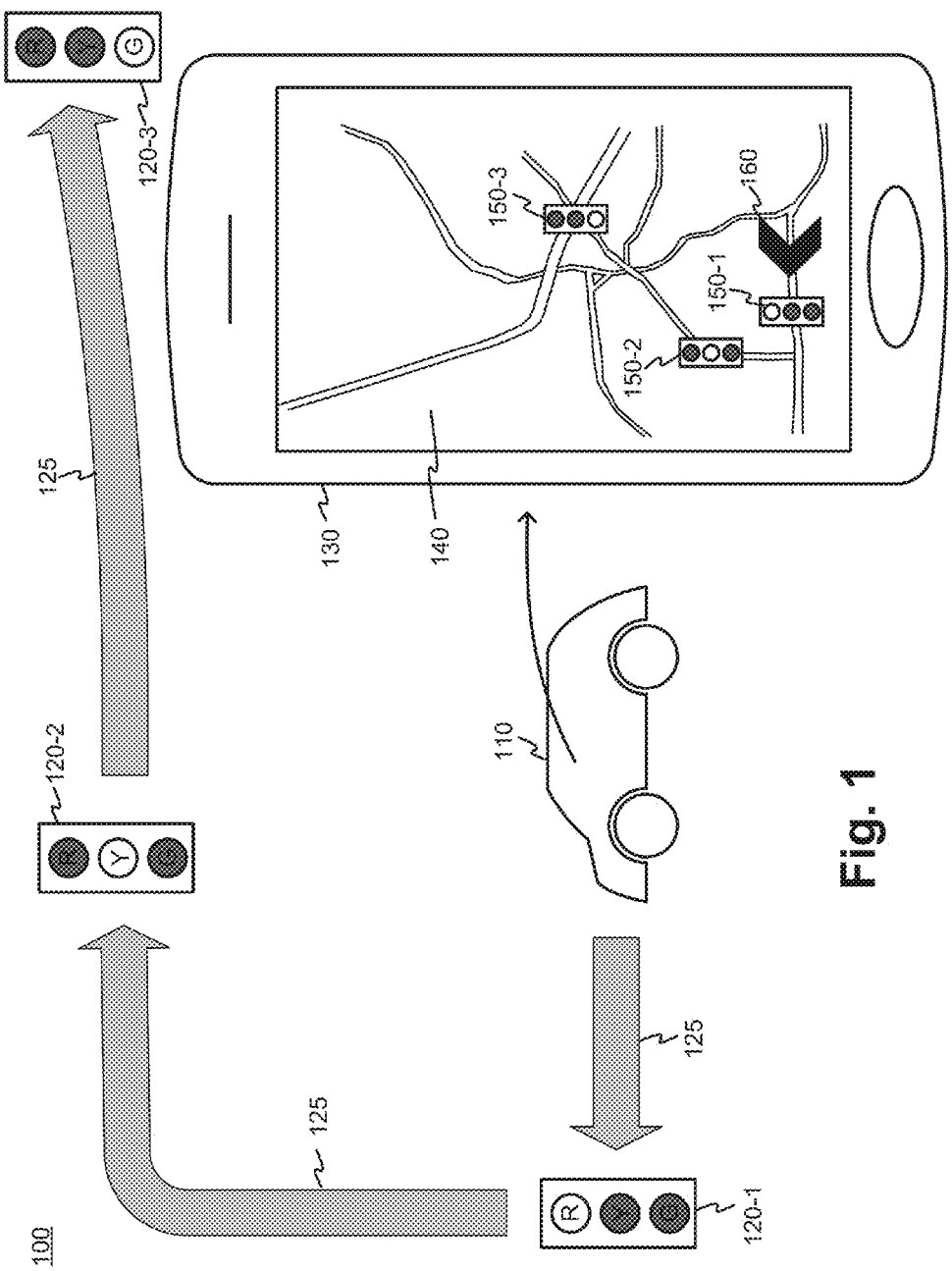
FIG. 1 is an illustration showing an exemplary environment which includes a vehicle utilizing road infrastructure information.

The following detailed description refers to the accompanying drawings. The same reference numbers in different drawings may identify the same or similar elements. The following detailed description does not limit the invention.

Embodiments described herein are directed to devices which assist vehicle operators by providing current road infrastructure information during the operation of the vehicle. In an embodiment, the road infrastructure information may include data describing the status and/or states of road infrastructure elements. The road infrastructure information may be wirelessly received though a mobile device (hereinafter referred as a User Equipment (UE)) associated with a driver and/or the vehicle. The road infrastructure information may be used by the driver to improve the situational awareness of the driver's surroundings, and allow safer and more efficient operation of the vehicle.

The road infrastructure elements may be any type of communications, signaling, and/or sensing device which facilitates the operation of roads and/or controlling of vehicular traffic thereon. Road infrastructure elements may include devices, also referred to herein as road infrastructure output elements, which may provide information to drivers. Road infrastructure output elements may include, for example traffic signals, electronic signage, lane indicators, etc. Road infrastructure elements may also include devices, also referred to herein as road infrastructure input elements, which may collect information regarding, for example, road status and or traffic conditions. Road infrastructure input elements may include, for example, video cameras, traffic sensors (e.g., in-road inductive sensors), etc. The road infrastructure elements may provide road infrastructure information that can include announcements, messages, and/or other broadcasts relating to the status of roads and/or traffic. For example, road infrastructure information may include data pertaining to road closures, detours, lane closures and/or reassignments, bridge configurations (e.g., draw bridge up or down), toll road/high occupancy vehicle (HOV) lane status, and/or toll booth status (manned, unmanned, exact change required, etc.). The road infrastructure information may useful to the driver as it can be provided well enough in advance so the driver can take remedial action, such as taking a different route, to avoid delays.

In one embodiment, the UE may include a wireless interface which communicates over a wireless channel, and a position determination system, such as a Global Positioning System (GPS) receiver that may be configured to determine the position of the UE. The UE may include a memory configured to store instructions, and a processor configured to execute the instructions stored in the memory. The processor may transmit a request for road infrastructure data which includes the position of the UE, and receive road infrastructure data which may include road infrastructure information regarding the state of infrastructure element(s) (e.g., traffic signal(s)) within a proximity of the UE. The processor may further generate map data of the proximity indicating the position and the state of road infrastructure element(s), and provide the generated map data to a display on the UE. The proximity may be predefined, and can be large enough in extent to exceed the line of sight of a driver associated with the UE.

FIG. 1 is an illustration showing an exemplary environment 100 where a driver of a vehicle 110 may utilize road infrastructure information to facilitate the operation of vehicle 110. In a typical urban or suburban environment, vehicle 100 may encounter many road infrastructure elements over route 125. In this example, the road infrastructure elements may include traffic signals 120 (herein referred to plurally as "traffic signals 120," and individually as "traffic signals 120-*x*") and electronic sign 127. Depending upon driving conditions, traffic signal placement, road layout, etc., the driver of vehicle 110 may only be able to observe a limited number of traffic infrastructure elements in advance (i.e., those within the line of sight of the driver), and thus not know or be able to reasonably predict their state (e.g., whether the traffic signal is "red,", "yellow," or "green" or is about to change), or receive traffic element information provided for the benefit of the driver (e.g., or whether a lane is closed as shown on electronic sign 127). For example, as shown in FIG. 1, the driver of vehicle 110 will likely be able to see traffic signal 120-1 in advance, and be able to ascertain that it is "red" and act accordingly based upon the distance to traffic signal 120-1 and the speed of vehicle 110. However, traffic signals 120-2 and 120-3, which are located further along route 125, may not be visible to the driver of vehicle 110 (i.e., may be beyond the line of sight of the driver), and thus the driver cannot make any decisions based upon the status of traffic signals 120-2 and 120-3. Additionally, the driver of vehicle 110 may not be able to read electronic sign 127 upon approaching traffic signals 120-1 and 120-2, which may limit options to reroute vehicle 110 as some options may be unavailable upon approaching electronic sign 127. In an embodiment, the vehicle 110 driver may have access to User Equipment (UE) 130, which can display a map 140 of an area in proximity to UE 130. Map 140 may show icons representing traffic infrastructure elements and their positions with respect to vehicle 110. For example, traffic infrastructure icons may include may include signal icons 150-1, 150-2, and 150-3 (herein referred to plurally as "traffic icons 150," and individually as "traffic icons 150-*x*"), which show the positions and states of traffic signals 120-1, 120-2, and 120-3, respectively, on map 140. Traffic infrastructure icons may also include sign icon 157, which and further indicate its information content along with its position on map 140. Map 140 may also illustrate a vehicle icon 160 representing vehicle 110. Vehicle icon 160 may show the position and/or direction of vehicle 110 on map 140. As shown in FIG. 1, the traffic infrastructure elements may be rendered in a skeuomorphic manner, however, in other embodiments, other representations may be used to conserve space. For example, each traffic icon 150-*x* may be simply drawn as a single dot, or filled in circle, having a color (e.g., red, yellow, or green) representing the current state of respective traffic signal 120-*x*. In another example, sign icon 157 may include information (e.g., text or graphics) provided on electronic sign 127 as shown in FIG. 1. In other embodiments, the sign icon 157 may itself may contain no information, but may be touched or otherwise activated by the driver to display the information shown on electronic sign 127.

Additionally or alternatively, the appearance of traffic infrastructure elements on map 140 may be altered to indicate whether one or more traffic infrastructure elements lie beyond the line of sight of the driver. For example, traffic icons 150-2 and 150-3 and sign icon 157 may be shown in a different size, color, and/or transparency than traffic icon 150-1, as traffic light 120-1 would be in the line of sight of the driver of vehicle 110, while traffic lights 120-2 and 120-3, and electronic sign 127, lie beyond the line of sight of the driver of vehicle 110. In other embodiments, as will be described in more detail below, additional information may be displayed, such as the traffic density at intersections (based on readings from in-street sensors and/or video cameras), suggested speeds at which a vehicle should travel to minimize wait times at traffic signals 150, and/or routes illustrated on map 140 to minimize overall wait time at traffic signals 150 through route 125.

By having road infrastructure information reflecting the real-time state and/or status of road infrastructure elements, the driver of vehicle 110 may be provided with information in advance to promote safer and more predictable operation of vehicle 110. For example, knowing the state of traffic signals in advance may prevent drivers from speeding up to "beat" the nearest light, only be stopped at a subsequent one. Thus, moderating driving behavior in such a manner can improve driver and pedestrian safety, reduce accidents, and increase the fuel efficiency of vehicle 110. Moreover, receiving the road infrastructure information over a wireless network utilizes network capacity thus engaging wireless customers in their data plans.

Figure 2B:
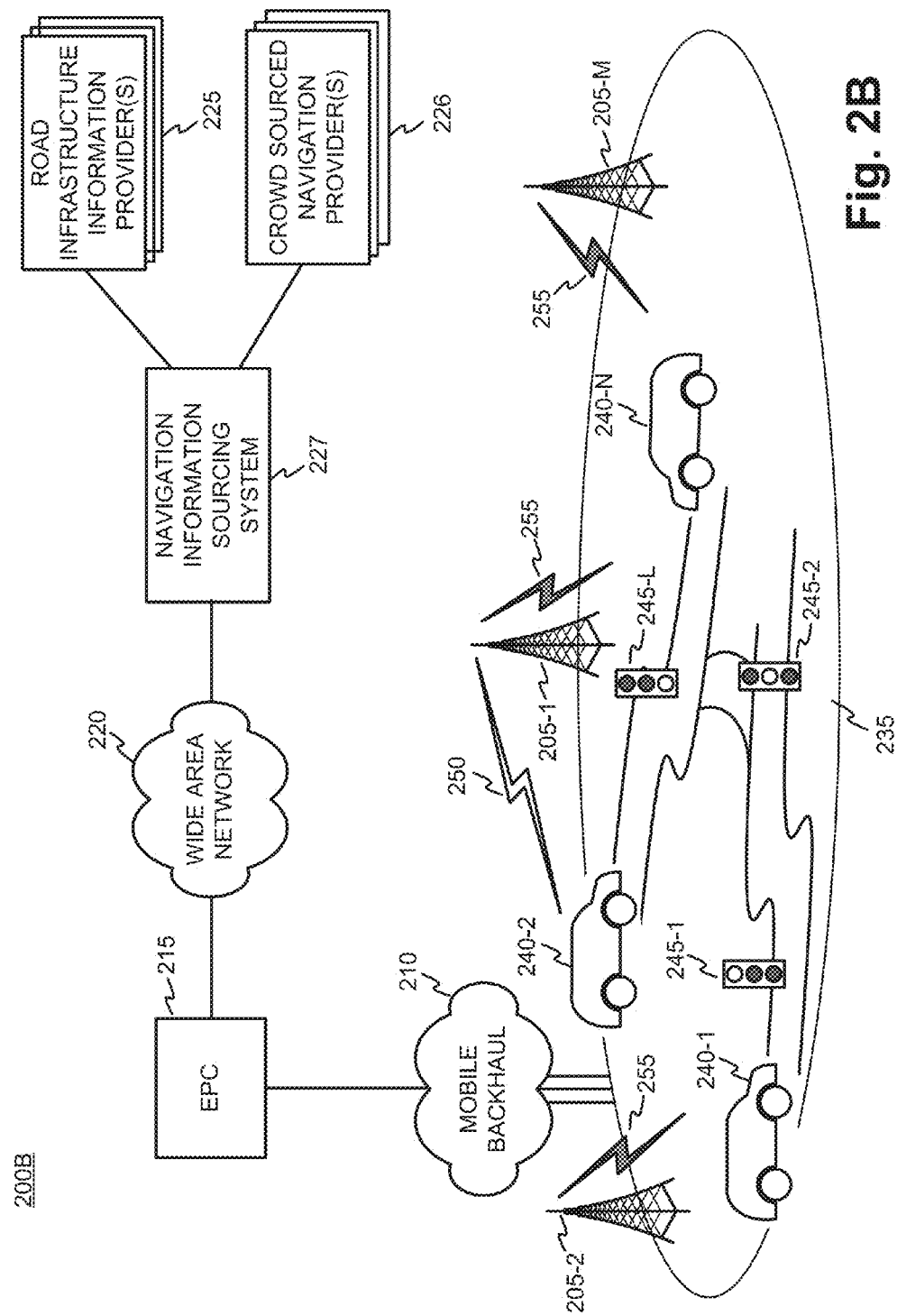

FIGS. 2A and 2B are diagrams showing exemplary systems for the wireless distribution and utilization of road infrastructure information. While the embodiments shown in FIGS. 2A and 2B are presented in the context of a Long Term Evolution (LTE) based system for providing road infrastructure information, any other wireless approaches, such as, for example those encompassed by WiFi, WiMAXX, 3GPP, and/or 3GGP2 standards, may be used. Additionally, and type of transmission techniques, including multicast and/or broadcast protocols/wireless standards, may be used to provide the road infrastructure information to UEs 130.

FIG. 2A shows an environment 200A according to an embodiment where the road infrastructure information may be provided wirelessly to vehicles, each being associated with a UE 130. Environment 200A may include eNodeBs 205 (herein referred to plurally as "eNodeBs 205," and individually as "eNodeB 205-*x*", where x=1, . . . , M), a mobile backhaul 210, an evolved Packet Core (ePC) 215, a wide area network 220, and road infrastructure information provider(s) 225. Any of vehicles 240 (herein referred to plurally as "vehicles 240," and individually as "vehicles 240-*x*", where x=1, . . . , N) may be driving within an area 235 that may surround, extend from, be based on the location of, move with, or otherwise be associated with, the vehicle, or vehicles, (area 235 also referred to herein as a "proximity"); the vehicle, or vehicles, may encounter road infrastructure elements (e.g., traffic signals as shown in FIGS. 2A and 2B). For ease of explanation, a common area 235 is shown in FIG. 2A, however in actual operation, each vehicle 240 may have its own proximity or area 235 which may be shown on map 140, as will be described in more detail below. In other embodiments, area 235 may correspond to a proximity in relation to vehicle, or vehicles, 240 determined by the scale of map 140, which may be selected by the user or determined automatically. Alternatively, the user may select a distance or area for display (e.g., such as within two miles of a vehicle's current location) to define area 235. In another embodiment, area 235 may increase or decrease based upon the speed of vehicle 240-*x*, or upon the environment in which vehicle 240-*x* is currently driving. For example, as the complexity of the surroundings of vehicle 240-*x* increases, such as in urban environments, area 235 may automatically be reduced. As the complexity of the surroundings of vehicle 240-*x* is reduced, area 235 may automatically increase. Alternatively, or in addition to a change in size, the shape of area 235 may automatically change depending upon the environment, or may be set and fixed by the user.

In other embodiments, area 235 may be defined by eNodeBs 205 and/or EPC 215, and/or may be defined by the protocols used to provide information to the UEs 130 (such as, for example, a multimedia broadcast multicast services (MBMS) area)). For example, in an embodiment, area 235 may correspond to an area including the cells associated with a group of eNodeBs 205 which may be coordinated to provide road infrastructure information and/or crowd sourced navigation in the form of multicast transmissions to vehicles 240. Multicast transmissions may be provided using a simulcast technique that sends similar waveforms at substantially the same time from multiple eNodeBs 205. Vehicles 240 in area 235, which are equipped with UEs 130 that are configured to receive multicast traffic and road information, may receive the multicast transmissions that include road infrastructure data.

Embodiments may provide road infrastructure data in accordance, for example, with LTE's eMBMS standard, with area 235 corresponding, for example, to a Multimedia Broadcast over a Single Frequency Network (MBSFN) area. MBSFN multicast provides an efficient approach to deliver the road infrastructure data over LTE, where Orthogonal Frequency Division Multiplexed (OFDM) signals enhance gain from signal frequency network transmission. Efficient signal combining at the UE receivers in vehicles 240 may achieve high operating Signal-to-Noise Ratios (SNRs). As used herein, an MBSFN area may include a group of eNodeBs (e.g, eNodeBs 205), along with their associated cells, which are coordinated to transmit substantially identical waveforms at the approximately same time. The coordinated transmission may be "seen" as a single transmission by the UEs located in the MBSFN area. In other embodiments, road infrastructure data may be provided over other non-broadcast protocols in accordance with any wirelesses standard.

Road infrastructure data may be provided from road infrastructure information provider(s) 225 in response to receiving a request 250 through UE 130 from, or in, for example, vehicle 240-2. Alternatively, the road infrastructure data may be "pushed" down to UEs 130 in, for example, vehicles 240-1 and 240-N without having to initially send a request. For example, as shown in FIG. 2A, while driving in area 235, vehicle 240-2 may provide request 250 for road infrastructure data prior to encountering traffic signal 245-L. Using UE 130 in vehicle 240-2, a driver may initiate request 250 through a user interface of UE 130. Request 250 may be wirelessly transmitted to eNodeB 205-1 from vehicle 240-2 in a unicast message. Request 250 may include a user identification and/or credentials, the position and/or velocity of vehicle 240-2, and/or a specification of the extent and/or position of area 235 for which road infrastructure information is being requested. ENodeB 205-1 may send the traffic notification to EPC 215 via mobile backhaul 210. EPC 215 may receive request 250 and forward it one or more road infrastructure information providers 225. Road infrastructure information provider(s) 225 may analyze the request 250 in terms of the user identification and/or credentials, the position and/or velocity of vehicle 240-2, the specification of area 235, and/or any other information which may be provided in request 250.

Based on request 250, the road infrastructure information provider(s) 225 may collect, process, and/or consolidate road infrastructure information generated by road infrastructure elements, which may include status and/or states of traffic signals 245, along with their positions, traffic flow information from inductive, pressure, force, and other types of sensors (not shown), information from video cameras, electronic signage information, etc. The road infrastructure information may be provided to EPC 215 via wide area network 220 for wireless transmission 255 over the network to UE 130 in vehicle 240-2. Alternatively or additionally, road infrastructure information may be pushed down to vehicles 240-1 and 240-N without having to receive a request beforehand. As noted above in an embodiment, transmission 255 of road infrastructure data may performed using MBMS protocols. In doing so, EPC 215 may first determine the actual area 235 (on a per UE basis) based on the request 250, and determine which eNodeBs 205 will be involved in the transmission 255 of the road infrastructure data. For example, EPC 215 may generate the proper MBMS data and control signals, and provide the messages to eNodeBs 205 to transmit multicast road infrastructure information to vehicles 240.

Using MBMS to provide road infrastructure information permits efficient use of radio resources, as vehicles 240 which receive MBMS transmission 255 do not have to periodically update the road infrastructure information providers 225 with position information. Additionally, not having to provide road infrastructure information providers 225 with position information can alleviate privacy concerns of users. The position information of a vehicle (e.g., 240-2) may only be used when the vehicle provides a request 250 to road infrastructure information provider(s) 225. Vehicles 240-1 and 240-N that receive MBMS transmissions 255 do so by virtue of being in area 235 and thus do not have to update road infrastructure information provider(s) 225 with their positions. Accordingly, by using MBMS features of LTE (e.g., eMBMS), a balance may be provided between information which is communicated from vehicles 240 providing requests 250 and road infrastructure data forwarded to the appropriate vehicles 240 in area 235.

Further referring to FIG. 2A, eNodeBs 205 may exchange traffic data with EPC 215 via mobile backhaul network 210. Mobile backhaul network 210 may further exchange traffic between eNodeBs 205 in an LTE system without having to go through the EPC 215. EPC 215 may further exchange traffic data with road infrastructure information provider(s) 225 over a wide area network 220. Additionally, eNodeBs 205 may be functionally interconnected to each other in addition to being separately connected to mobile backhaul network 210, and may be referred to as the evolved UMTS Terrestrial Radio Access Network (eUTRAN). In other embodiments using different wireless standards, the eNodeBs 205 may be referred to as base stations and the eUTRAN referred to simply as a Radio Access Network (RAN). In addition to exchanging traffic data with eNodeBs 205 via mobile backhaul network 210, EPC 215 may perform control operations for eNodeBs 205 and UEs 130 within vehicles 240 based at least in part on control plane signals (e.g., Non-Access Stratum functionality). EPC 215 may interface with other EPCs through a WAN (not shown) to exchange traffic data.

Further referring to FIG. 2A, mobile backhaul network 210 may be any type network which supports one or more eNodeBs 205 for interfacing with EPC 215. Mobile backhaul network 210 may include Cell Site Routers (CSRs), Extended Backhaul (EBH) network(s), optical networks which include wavelength division multiplexed (WDM) optical components, multiservice provisioning platforms (MSPPs), metro-Ethernet networks, etc.

EPC 215 may be a core networking infrastructure that provides mobility management, session management, MBMS (e.g., eMBMS) functionality, authentication, and packet transport to support UEs 130 and eNodeBs 205 for wireless communication, including road infrastructure data transmissions 255. EPC 215 may be compatible with known wireless standards which may include, for example, LTE, LTE Advanced, Global System for Mobile Communications (GSM), Universal Mobile Telecommunications System (UMTS), IS-2000, etc.

ENodeB 205 may be any type of base station that can be included within any type of radio access network, and can be compatible with known wireless standards. Such standards may include, for example, LTE, LTE Advanced, GSM, UMTS, IS-2000, etc. In some embodiments, eNodeB-x 205 may be a wireless access point which can service any type of Wi-Fi standard (e.g., any IEEE 801.11x network, where x=a, b, c, g, and/or n), and/or include any other type of wireless network technology for covering larger areas, and may include a mesh network (e.g., IEEE 801.11s) and/or or a WiMAX IEEE 802.16.

Road infrastructure information provider(s) 225 may be any type of networking device which may receive, analyze, and process multiple requests 250 for road infrastructure information, and generate and provide messages to EPC 215 for transmission 255 of road infrastructure data. Road infrastructure information provider(s) may be owned and/or operated by one or more government agencies responsible for road infrastructure operation and maintenance, and may include city, state, and/or federal government agencies, and/or local municipalities, depending upon the nature of the road network being traversed. Accordingly, road infrastructure information provider(s) 225 may be implemented as a general processor-based system executing software (e.g., a server or other network element), or embodied using dedicated hardware (e.g., ASICs, FPGAs, etc.), or as a combination thereof. Road infrastructure information provider(s) 225 may interface to EPC 215 thorough wide area network 220 (as shown in FIG. 2A), or may alternatively connect to EPC 120 through a local interface.

Wide Area Network 220 may include any type wired or wireless network covering larger areas. For example, WAN 220 may include a metropolitan area network (MAN), a Public Switched Telephone Network (PSTN), an ad hoc network, an intranet, the Internet, a fiber optic-based network, a wireless network, and/or a combination of these or other types of networks. WAN 220 may be an IP based network or utilize Multi Protocol Label Switching (MPLS), and may include a mesh network (e.g., IEEE 801.11 s) and/or or a WiMAX IEEE 802.16. WAN 220 may include one or more circuit-switched networks and/or packet-switched networks.

FIG. 2B shows an environment 200B according to an embodiment where the road infrastructure information may be provided through an intermediary network device described herein as a navigation information sourcing system 227. Environment 200B includes the same or similar elements, described above in relation to FIG. 2A, which are identified by the same reference numbers. The discussion of common elements will not be repeated in the description of FIG. 2B for the sake of brevity.

Navigation information sourcing system 227 may collect and consolidate road infrastructure data from road infrastructure information provider(s) 225. The collected information may be provided to UEs 130 associated with vehicles 240 as a service, which may be associated with a periodic payments by drivers of vehicles 240. The road infrastructure data may be provided to EPC 215 over wide area network 220, and then onto mobile backhaul 210 for transmission via eNodeBs 205. As noted above, in some embodiments, the road infrastructure data may be provided over MBMS, and may be initiated by request 250 as shown for vehicle 240-2, or alternatively, the road infrastructure data may be pushed to UEs 130 without prior request, as shown for vehicles 240-1 and 240-N. In an embodiment, road infrastructure data transmissions 255 may only be decoded by vehicles 240 having a registered service account with navigation information sourcing system 227. Accordingly, navigation information sourcing system 227 may further provide authentication, administration, and accounting functionality in relation to providing road infrastructure information to subscribers as a service. Thus, vehicles 240 may be specifically identified as members of a service to receive information from navigation information sourcing system 227, and thus are authorized to receive and decode transmissions 255.

Additionally, navigation information sourcing service system 227 may further receive crowd sourced navigation information, provided by other users within the wireless network, to identify road hazards, congested routes, construction, and aggregate speeds for traffic flow, etc. Navigation information sourcing system 227 may integrate the crowd sourced navigation information with the road infrastructure information in transmissions 225 sent to UEs 130 associated with vehicles 240. Using road infrastructure information and/or the crowd sourced navigation information, embodiments may determine routes and/or suggest driving speeds so that vehicles 240 improve the probability of encountering traffic signals 245 when they are green.

Additionally or alternatively, routing recommendations based on patterns and/or prior history of driving behavior (e.g., based on vehicle speed, acceleration, etc.) may be determined by UE 130.

Navigation information sourcing system 227 may be any type of networking device which may receive, analyze, and process multiple requests 250 for road infrastructure information and/or crowd sourced navigation information, and generate and provide messages to EPC 215 for transmission 255 of road infrastructure data and/or crowd sourced navigation data. Navigation information sourcing system may be owned and/or operated by a network service provider or a third party commercial entity. Navigation information sourcing system 227 may be implemented as a general processor-based system executing software (e.g., a server or other network element), or embodied using dedicated hardware (e.g., ASICs, FPGAs, etc.), or as a combination thereof. Navigation information sourcing system 227 may interface to EPC 215 thorough WAN 220, or may alternatively connect to EPC 215 through a local interface. Details of an embodiment of navigation information sourcing system 227 are discussed below in reference to FIGS. 5 and 7.

Crowd sourced navigation providers 226 may be any type of networking device which may receive requests for crowd sourced navigation information, collect navigation information from users through the wireless network, consolidate the navigation information and provide messages to EPC 215, through navigation information sourcing system 227, for transmission 255 of the crowd sourced navigation data. Crowd sourced navigation provider(s) 226 may be implemented as a general processor-based system executing software (e.g., a server or other network element), or embodied using dedicated hardware (e.g., ASICs, FPGAs, etc.), or as a combination thereof. Road infrastructure information provider(s) 225 and crowd sourced navigation provider(s) 226 may interface to navigation information sourcing system 227 through a local network or may alternatively connect to navigation information sourcing system 227 through wide area network 220.

Figure 3:
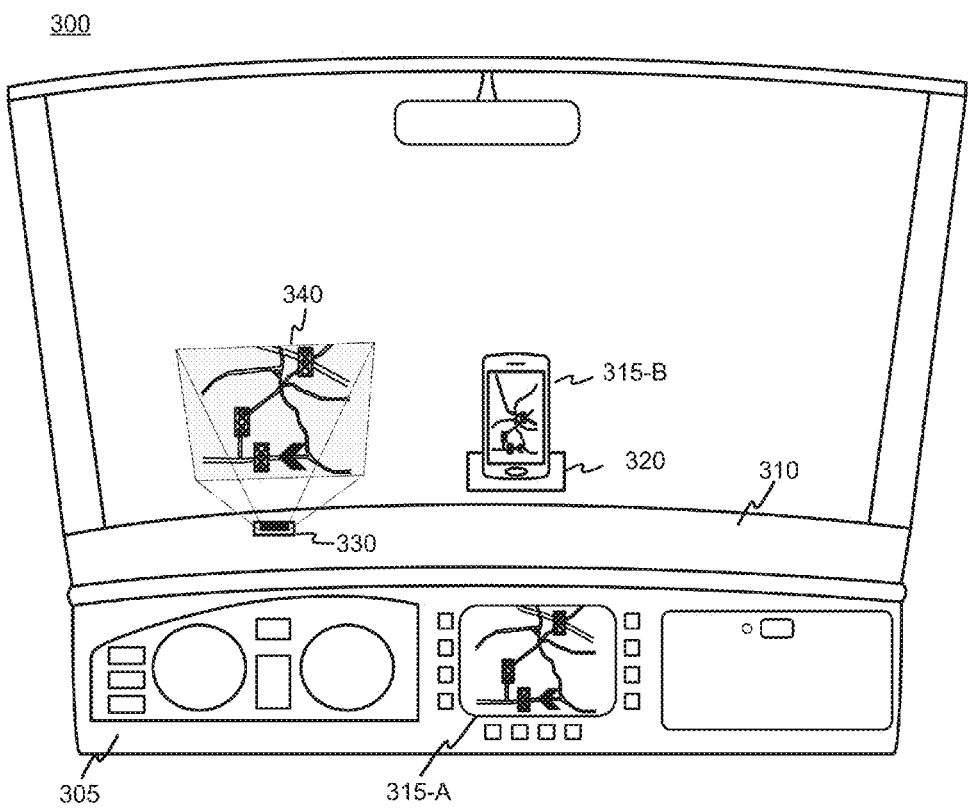
FIG. 3 is a diagram illustrating an interior of a vehicle showing different embodiments of a user equipment displaying road infrastructure information.

FIG. 3 is a diagram illustrating a vehicle interior 300 showing exemplary embodiments of a user device (e.g., UE 130 shown in FIG. 1). The perspective shown in FIG. 3 is from the viewpoint of a front-seat occupant looking towards the front of the vehicle, showing a dashboard 305 underneath dash pad 310. Vehicle interior 300 includes a UE 315 (referred to generically as "UE 315," plurally as "UEs 315," and specifically as "UE 315-A" or "UE 315-B," when referring to particular embodiments). In an embodiment, vehicle interior 300 may further include a "Heads-Up" Display (HUD) unit 330.

UE 315 may include a user interface which supports a map and/or user interface elements to permit a driver of vehicle 240 to command UE 315 to generate and wirelessly transmit a request 250 for road infrastructure information. UE 315 may include position determination capabilities to include the position of the vehicle 240 in the request. UE 315 may include additional user interface elements so that the driver may quickly and efficiently provide information describing other information to assist in the navigation of vehicle 240-x. For example, UE 315 may present in the form of a graphics display, classes of traffic hazards which may be quickly selected by the user using a touch interface. Alternatively or additionally, UE 315 may receive voice inputs from the driver, and use voice recognition algorithms to extract information to generate request 250.

In one embodiment, UE 315-A may be realized as device built into dashboard 305, and serve as a navigation system and user interface that may wirelessly connect to road infrastructure information providers 225 or navigation information sourcing system 227 via the wireless network using an on-board transceiver. The on-board transceiver associated with UE 315-A may be integral to the chassis associated with the display shown in FIG. 3, or may be included in a separate chassis which is functionally connected to the chassis. The user may enter inputs using a touch screen associated with UE 315-A, other user physical input devices (e.g., a joystick, a touch pad, dial(s), buttons, etc.), and/or voice recognition. UE 315-A may have the ability to download additional software in the form of applications (i.e., "apps"), which may be provided by road infrastructure information provider(s) 225, crowd sourced navigation provider(s) 226, and/or navigation information sourcing system 227, in order to provide UE 315-A the ability to transmit requests 250 and/or receive transmissions 255 including road infrastructure data and/or crowd sourced navigation data.

In another embodiment, UE 315-B may a separate mobile device which can be placed within the vehicle, or be removably attached to an interior surface of the vehicle as shown in FIG. 3. For example, UE 315-B may be a smart phone removably coupled to a cradle 320 that can be mounted to the interior of the front windshield of the vehicle (as shown in FIG. 3), or to dash pad 310. Cradle 320 may only serve a mechanical function to secure UE 315-B, or may additionally provide electrical functionality to interface with one or more vehicle electronic systems (VESs) within the vehicle, accept vehicle power for charging UE 315-B, and/or provide an interface so that UE 315-B may exchange information with the vehicle's electronics system(s) (VESs). Cradle 320 may provide such an interface using physical connections to one or more VESs based on industry standard interfaces and protocols. Additionally, or alternatively, wireless channels between UE 315-B and the vehicle may be used for interfacing with one or more VESs. UE 315-B may support a variety of wireless interfaces with the vehicle which may include, for example, Bluetooth, Bluetooth Low Energy, Zigbee, Wi-Fi, etc. Additional wireless interfaces may be used, for example, to facilitate the interface of UE 315-B with the vehicle. For example, cradle 320 may use a Near Field Communication (NFC) wireless channel to exchange information with UE 315-B. NFC wireless channel may be used to exchange credentials for verification with road infrastructure information provider(s) 225, crowd sourced navigation provider(s) 226, and/or navigation information sourcing system 227, trigger processes on UE 315-B, such as, for example, automatically start an application for providing the ability to send traffic notifications and receive traffic alerts to/from road infrastructure information provider(s) 225, crowd sourced navigation provider(s) 226, and/or navigation information sourcing system 227. Cradle 320 may further provide electrical power to UE 315-B so it may be charged (either inductively or through a physical connection) while mounted within cradle 320.

UE 315-B may include any type of mobile electronic device having communication capabilities, and thus communicate over a network using one or more different channels, including both wired and wireless connections. UE 315-B may include, for example, a cellular (e.g., LTE compatible) mobile phone, a smart phone, a telematics device coupled to an OBD-II port, or diagnostic port, of a vehicle, a telematics device built into a vehicle by an original equipment manufacturer that communicates with one, or more, of the vehicle's data communications busses, a tablet, any type of IP communications device, a laptop computer, or a palmtop computer. In various embodiments, wireless channels over which UE 315 communicates may be supported by any cellular radio access network (RAN), such as, for example, an LTE eUTRAN. In other embodiments, the wireless channels may be supported by a local or wide area wireless network. A local area wireless network may include any type of Wi-Fi (e.g., any IEEE 801.11x network, where x=a, b, c, g, n, and/or AC). A wide area wireless network may include any type wireless network covering larger areas, and may include a mesh network (e.g., IEEE 801.11s) and/or or a WiMAX IEEE 802.16.

In another embodiment, the graphics display provided by UE 315 (either UE 315-A or UE 315-B) may be included in a projection 340 generated by HUD unit 330. HUD unit 330 may provide a display which includes a map and/or any other visual information generated by UE 315. Projection 340 may appear to the driver as a translucent image of such a size and character as to not distract the driver from seeing out of the windshield of vehicle interior 300.

Figure 4:
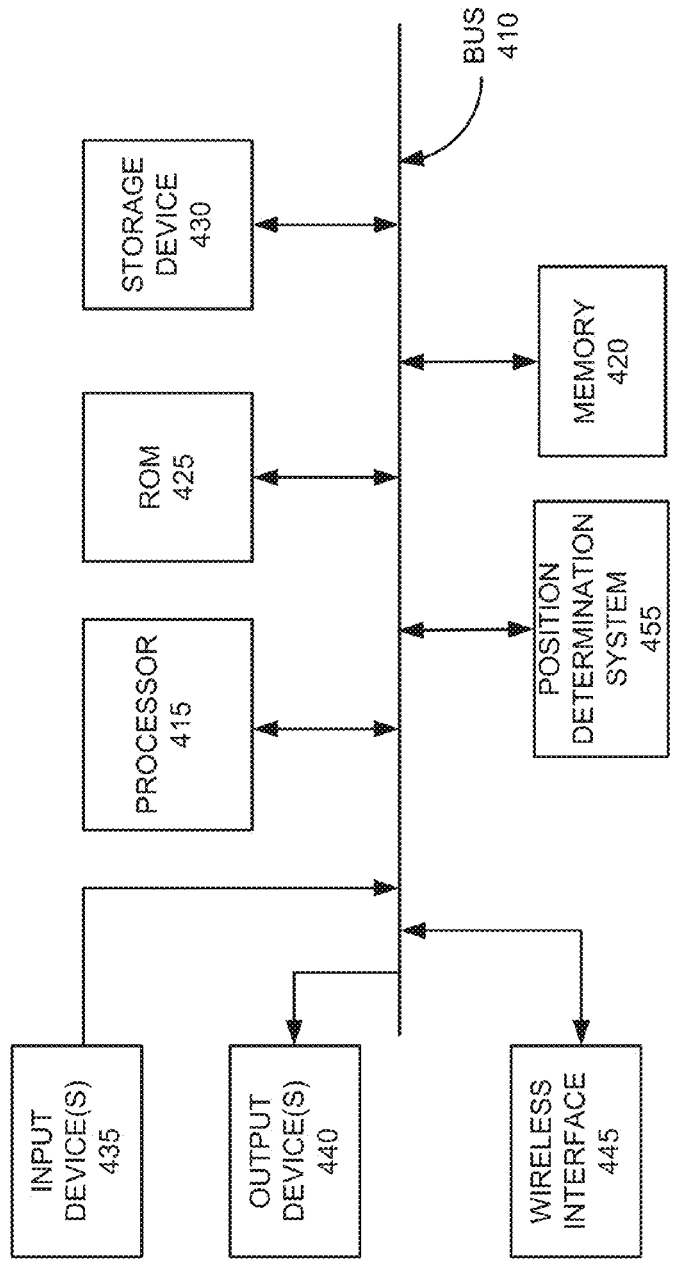
FIG. 4 is a block diagram showing exemplary components of a User Equipment (UE) device according to an embodiment.

FIG. 4 is a block diagram showing exemplary components of a User Equipment (UE) 315 according to an embodiment. UE 315 may include any mobile communication device configured to communicate with eNodeB 205-*x* via wireless signals. For example, UE 315 may include a portable communication device (e.g., a mobile phone, a smart phone, a phablet device, a global positioning system (GPS) device, and/or another type of wireless device as described elsewhere herein); an in-vehicle navigation system which may include a head unit for user interaction and control, a telephone terminal; a personal computer or workstation; a server device; a laptop, tablet, or another type of portable computer; a media playing device; a wearable computer; a portable gaming system; and/or any type of mobile device with wireless communication capability.

UE 315 may include a bus 410, a processor 415, memory 420, a read only memory (ROM) 425, a storage device 430, one or more input device(s) 435, one or more output device(s) 440, a wireless interface 445, and a position determination system 455. Bus 410 may include a path that permits communication among the elements of UE 315.

Processor 415 may include a processor, microprocessor, or processing logic that may interpret and execute instructions. Memory 420 may include a random access memory (RAM) or another type of dynamic storage device that may store information and instructions for execution by processor 415. ROM 425 may include a ROM device or another type of static storage device that may store static information and instructions for use by processor 415. Storage device 430 may include a magnetic and/or optical recording medium and its corresponding drive.

Input device(s) 435 may include one or more mechanisms that permit an operator to input information to UE 215, such as, for example, a keypad or a keyboard, a microphone, voice recognition, a touchscreen, and/or biometric mechanisms, etc. Output device(s) 440 may include one or more mechanisms that output information to the operator, including a display (e.g., a liquid crystal display (LCD), heads-up display, etc.), a speaker, etc. Wireless interface 445 may include any transceiver mechanism that enables UE 315 to communicate with other devices and/or systems. For example, wireless interface 445 may include mechanisms for communicating with another device or system via a network, such as wireless network supported by eNodeBs 205, mobile backhaul 210, and EPC 215.

Position determination system 455 may be any system that provides position data in an absolute reference (e.g., a satellite navigation system (SNS) receiver providing position data in the WGS-84 system) and/or relative reference(s) (e.g., accelerometers). When deriving positions, position determination system 455 may utilize a receiver specifically designed for use with the SNS that extracts position, using conventional techniques, from a plurality of signals transmitted by SNS satellites. Various SNSs may be used, which typically include a system of transmitters positioned to enable UEs 315 to determine their locations based on signals received from the transmitters. In a particular example, such transmitters may be located on Earth orbiting satellites. For example, a satellite in a constellation of Global Navigation System (GNS) such as Global Positioning System (GPS), Galileo, or Glonass may transmit a signal marked with a Pseudorandom Noise (PN) code that may be distinguishable from PN codes transmitted by other satellites in the constellation.

UE 315 may perform certain operations or processes, as may be described in detail below. UE 315 may perform these operations in response to processor 415 executing software instructions contained in a computer-readable medium, such as memory 420. A computer-readable medium may be defined as a physical or logical memory device. A logical memory device may include memory space within a single physical memory device or spread across multiple physical memory devices. The software instructions may be read into memory 420 from another computer-readable medium, such as storage device 430, or from another device via wireless interface 445. The software instructions contained in memory 420 may cause processor 415 to perform operations or processes that will be described in detail with respect to FIG. 6. Alternatively, hardwired circuitry may be used in place of or in combination with software instructions to implement processes consistent with the principles of the embodiments. Thus, exemplary implementations are not limited to any specific combination of hardware circuitry and software. The configuration of components of UE 315 illustrated in FIG. 4 is for illustrative purposes only. It should be understood that other configurations may be implemented. Therefore, UE 315 may include additional, fewer and/or different components than those depicted in FIG. 4.

Figure 5:
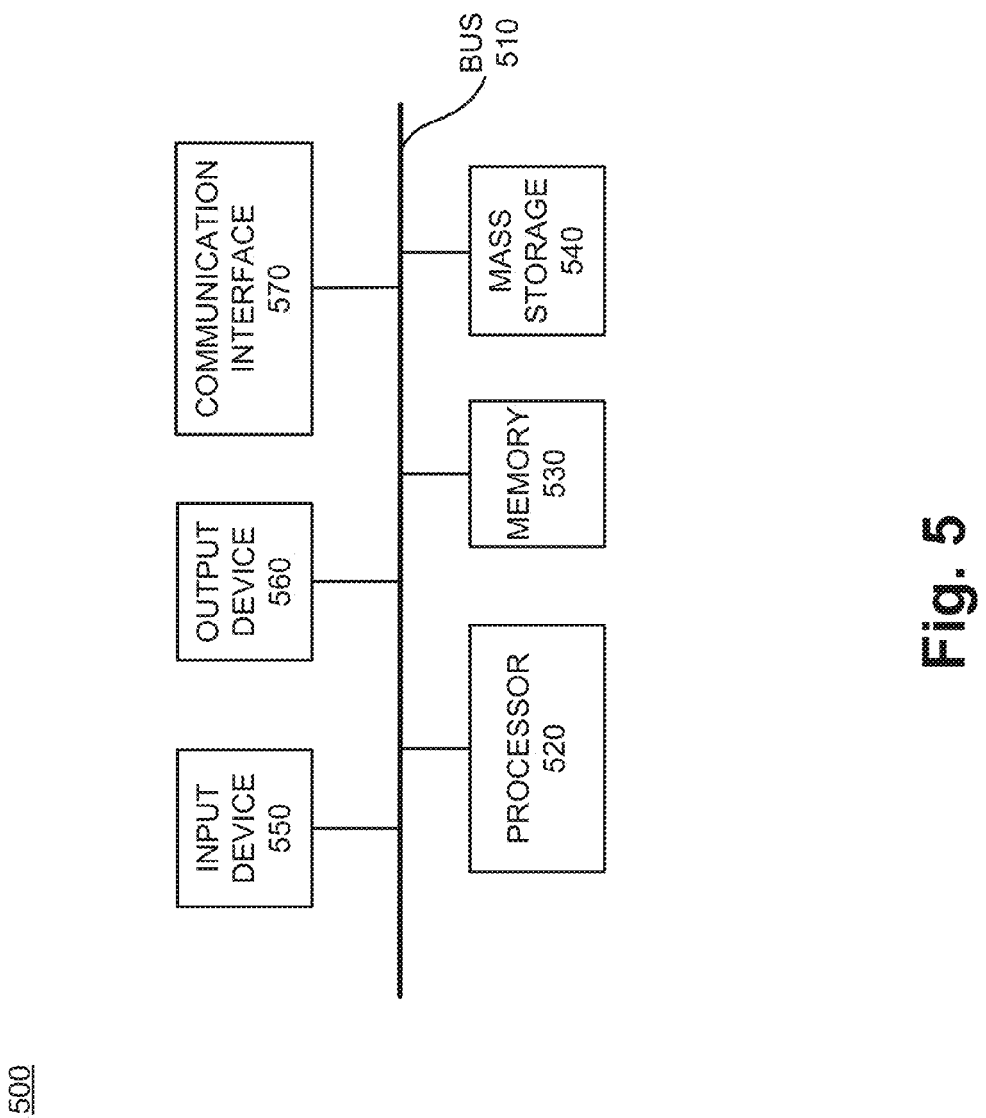
FIG. 5 is a block diagram illustrating exemplary components of a navigation information sourcing system within the exemplary environment of FIG. 2B.

FIG. 5 is a block diagram showing exemplary components of a network element 500 which may represent, for example, road infrastructure information provider(s) 225, crowd sourced navigation provider(s) 226, and/or navigation information sourcing system 227. Network element 500 may include a bus 510, a processor 520, a memory 530, mass storage 540, an input device 550, an output device 560, and a communication interface 570.

Bus 510 includes a path that permits communication among the components of network element 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic. For example, processor 520 may be an x86 based CPU, and may use any operating system, which may include varieties of the Windows, UNIX, and/or Linux. Processor 520 may also use high-level analysis software packages and/or custom software written in any programming and/or scripting languages for interacting with other network entities.

Memory 530 may include any type of dynamic storage device that may store information and/or instructions, for execution by processor 520, and/or any type of non-volatile storage device that may store information for use by processor 520. For example, memory 530 may include a RAM or another type of dynamic storage device, a ROM device or another type of static storage device, and/or a removable form of memory, such as a flash memory. Mass storage device 540 may include any type of on-board device suitable for storing large amounts of data, and may include one or more hard drives, solid state drives, and/or various types of Redundant Array of Independent Disk (RAID) arrays.

Input device 550, which may be optional, can allow an operator to input information into network element 500, if required. Input device 550 may include, for example, a keyboard, a mouse, a pen, a microphone, a remote control, an audio capture device, an image and/or video capture device, a touch-screen display, and/or another type of input device. In some embodiments, network element 500 may be managed remotely and may not include input device 550. Output device 560 may output information to an operator of network element 400. Output device 460 may include a display (such as a Liquid Crystal Display (LCD)), a printer, a speaker, and/or another type of output device. In some embodiments, network element 500 may be managed remotely and may not include output device 560.

Communication interface 570 may include a logical component that includes input and/or output ports, input and/or output systems, and/or other input and output components that facilitate the transmission of data to other devices. For example, communication interface 570 may include a network interface card (e.g., Ethernet card) for wired communications and/or a wireless network interface (e.g., a Wi-Fi) card for wireless communications. Communication interface 570 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form. Communication interface 570 may further include one or more Radio Frequency (RF) transceivers that enable communications with EPC 215 and/or other devices via wireless channels. An RF transceiver may include an RF transmitter that receives signals to be transmitted wirelessly and performs signal processing on the signals before providing the signals to an antenna assembly (not shown), and an RF receiver (not shown) that receives signals from the antenna assembly and performs signal processing on the received signals before providing the received signals to processor 520. For example, the RF transceiver may perform analog-to-digital and digital-to-analog conversion, modulation and demodulation, up-conversion and down-conversion, and/or amplification of signals.

As described below, network element 500 may perform certain operations relating to road infrastructure information provider(s) 225, crowd sourced navigation provider(s) 226, and/or navigation information sourcing system 227. Network element 500 may perform these operations in response to processor 520 executing software instructions contained in a computer-readable medium, such as memory 530 and/or mass storage 540. The software instructions may be read into memory 530 from another computer-readable medium or from another device. The software instructions contained in memory 530 may cause processor 520 to perform processes described herein, such as, for example, process 700 depicted in FIG. 7. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of network element 500, in other implementations, network element 500 may include fewer components, different components, additional components, or differently arranged components than depicted in FIG. 5.

Figure 6:
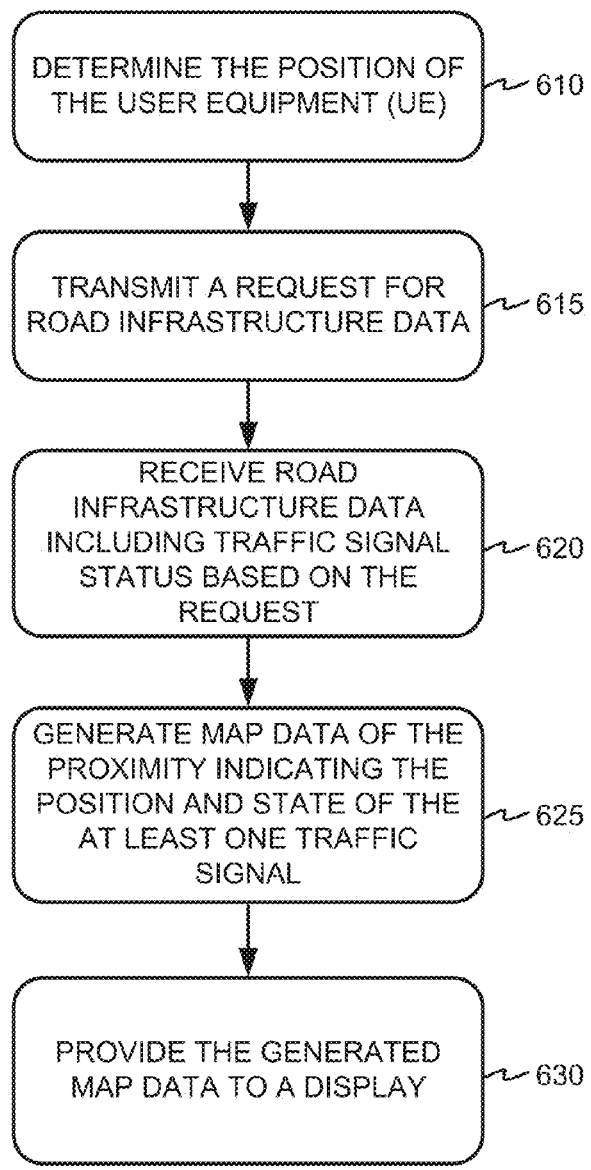
FIG. 6 is a flow chart showing an exemplary process for utilizing road infrastructure information.

FIG. 6 is a flow chart showing an exemplary process 600 for utilizing road infrastructure information. Process 600 may be performed by UE 315, for example, by executing instructions on processor 415. UE 315 may initially determine a position of a User Equipment (UE) (Block 610). The position of UE 315 may be determined by position determination system 455. UE 315 may transmit a request for road infrastructure data which includes the position of the UE (Block 615). The transmitted request may also include information specifying or suggesting a proximity to associate with UE 315. The shape, orientation, and/or the size of the proximity may be defined by its boundary, or boundaries, where the boundary, or boundaries, may be predefined, set manually, and/or vary automatically. For example, the proximity may define a two dimensional geometric shape, such as, for example, a circle, an annulus, a wedge, a section of an annulus, an oval, etc. Alternatively, the proximity may further defined by a three-dimensional shape, such as, for example, a sphere or a sector thereof, a torus or a sector thereof, a cone, an ellipsoid, etc. The proximity boundary, or boundaries, may automatically vary in size and/or shape as a function of the speed of vehicle, variations in geography (e.g., urban or country), or variations in the terrain relief, vehicle or wireless user equipment location, roadway (i.e., a long, straight, road segment in a sparsely populated region may have a large proximity oriented forward of the vehicle, whereas if a vehicle is driving on short, many-directional segments in a highly populated area, the proximity may be circular and surround the vehicle, or may have a shape that roughly corresponds to a planned, or suggested route from a navigation system, program, or application). For example, the proximity may be shaped as a wedge or a cone, with the apex centered at the position of the driver (or the center of the vehicle) with the center axis pointing in the direction of vehicle 110 travel (i.e., primarily forward looking), having a range extending to a point in front of the vehicle which may lie beyond the line of sight of the driver. The angle of wedge or cone and/or the range may vary based on geography (e.g., urban vs. country) as determined by the position of the UE 110, may vary based on speed, and/or may vary based on terrain relief. Alternatively, the angle may be increased to the extent where the proximity further includes the rear of the vehicle. In another embodiment, the proximity may be defined by a circle or sphere based on a radius that varies based on geography (e.g., urban or country), speed, terrain relief, and/or the parameters set by the driver. The circle or sphere may be specified as a radial distance from, for example, the position of the driver or the center of the vehicle. In another embodiment, the proximity may be established by a boundary shaped as an ellipse, with the major axis parallel to the motion of vehicle 110, and which may extend beyond the line of sight of the driver of vehicle 110. The length of the axes and/or the eccentricity of the ellipse may vary automatically based on geography (e.g., urban or country), the speed of vehicle 110, and/or the relieve of terrain, or may be manually set by the driver.

The transmitted request may further include providing the request to at least one road infrastructure information provider 225 or a navigation information sourcing system 227. In an embodiment, UE 315 may transmit periodic requests for road infrastructure data which update the position of the UE 315, and then receive updates of road infrastructure data based on the updated position of the UE 315. The user may manually trigger a transmitted request 250, for example, through a graphical user interface on UE 315.

UE 315 may receive road infrastructure data associated with one or more road infrastructure elements (e.g., traffic light(s) 120, electronic sign(s) 127, traffic sensors, video cameras, etc.) within a proximity of UE 315 (Block 620). In an embodiment, proximity of the UE may have a boundary which can exceed, or have one or more borders that extend beyond, the line of sight of a driver associated with UE 315. Exemplary approaches for determining the line of sight are provided in more detail below.

In an embodiment, UE 315 may receive updates of road infrastructure data based on the changes in the state of the at least one traffic signal within the proximity of UE 315. For example, UE 315 may automatically receive updates when an infrastructure element in the proximity changes state (e.g., each time that traffic signal 120-x changes state (e.g., red to green or vice versa), and/or electronic sign 127 changes its message). In an embodiment, the state of a traffic signal 120-x may include at least one of a signaling state, and/or an operational state. Additionally, a traffic flow state indicating the amount of traffic flow through an intersection may be provided in road infrastructure data. The traffic flow may be determined in conjunction with video cameras and/or inductive sensors fixed in an intersection associated with traffic signal 120-x, where video data and/or inductive sensor data may be processed to ascertain the traffic flow through an intersection.

In an embodiment, UE 315 may determine whether road infrastructure element(s) lie beyond the line of sight of the driver associated with UE 315, and may provide an indication on a graphical representation provided on display 140 showing which road infrastructure element(s) are beyond the line of sight of the driver. The indication may include displaying the representations of traffic infrastructure element(s) on display 140 using icons having varying size, color, transparency, animation, etc., for traffic infrastructure elements. In an aspect, variance in icon appearance may be applied only to traffic infrastructure elements that exceed the line of sight, while the appearance of icons within the line of sight of the driver being displayed in a default appearance.

The line of sight of the driver may be estimated based on the position of vehicle 110 and the positions of the traffic infrastructure elements. For example, based on the positions of vehicle 110 and the traffic infrastructure elements, ranges and/or angles between vehicle 110 and the traffic infrastructure elements may be calculated. Thresholds based on the calculated ranges and/or angles may be determined to establish the line of sight of the driver of vehicle 110. The thresholds may also be a function of the urban density and/or geographic complexity (e.g., relief of terrain, hills, tree canopy, etc.) of the area in which vehicle 110 is operating. Thus, in the city, the thresholds may be lowered to reduce the line of sight to account for buildings or other occlusions. In non-urban areas having little terrain relief, thresholds may be increased for longer line of sights to account for open areas. Additionally or alternatively, the variation in terrain relief (e.g., differences in height and/or the frequency in changes of the height of the ground) may affect threshold values, where areas having significant terrain relief may have reduced thresholds, and flat areas may have increased thresholds. The information associated with the urban density and/or geographic complexity may be provided, for example, from crowd sourced navigation provider(s) 226. Additionally and/or alternatively, when three dimensional position values are available for both vehicle 110 and the traffic infrastructure elements, differences in height may also be used to determine the line of sight. For example, if vehicle 110 and a traffic infrastructure element have a large height difference, the thresholds on range and/or angles may be changed appropriately to alter the line of sight. For example, if the height of the traffic infrastructure element is significantly lower than vehicle 110, then the threshold for the range on the line of sight may be reduced (thus estimating a shorter line of sight). If the height of the traffic infrastructure element is significantly higher than vehicle 110, then the threshold for the range on the line of sight may be increased (particularly if the surrounding environment is not a dense urban area). Additionally, the user may adjust the line of sight if the estimation is off for a particular area, and the UE 315 may geotag the adjustment so it may be used again when/if vehicle 110 returns to the particular area.

In an embodiment, when receiving road infrastructure data in Block 620, UE 315 may receive crowd sourced navigation information which includes traffic and road condition status provided by a plurality of users over a wireless network. Additionally or alternatively, UE 315 may receive information regarding a state of traffic signal(s) 120. In another embodiment, UE 315 may receive timing information regarding the state of the at least one traffic signal, where the timing information may include the period of time between changes in state, how long a traffic signal is in a particular state (e.g., the duration of a red, green, and/or yellow light), indications when the timing information changes, etc. UE 315 may then predict future signaling states of the at least one traffic signal based on the received timing information without having to be updated for each change in traffic signal state. In an embodiment, UE 315 may determine a speed at which a vehicle may travel to reduce wait time at the at least one traffic signal, and then provide the determined speed on display which associates the speed with the at least one traffic signal. In an aspect where UE 315 couples with a vehicle's data communication bus, the wait time at one or more upcoming traffic signals may be reduced by automatically adjusting the speed of the vehicle without driver intervention. In such an aspect, UE 315 may determine the appropriate speeds based on knowing the timing of the traffic signals, traffic density, etc., and subsequently transmit the associated data to the vehicle's onboard electronic control module to automatically control the speed of the vehicle.

Alternatively or additionally to determining and/or controlling the speed of the vehicle as described above, UE 315 may coordinate with upcoming "smart" traffic signal(s) and/or traffic control servers to reduce wait times. Smart traffic signals may use one or more sensors for determining whether traffic is approaching from other lanes, and may communicate with UE 315, either directly, or via a traffic control system connected to wide area network 220, to coordinate the speed of vehicle 110 with the status and/or prediction of state of the smart traffic signal to reduce wait times. In another aspect, a traffic control system and/or a telematics control server may control the speed of vehicle 110 remote through UE 315.

In another embodiment, UE 315 may determine route guidance based upon the received road infrastructure data, and provide a preferred route to the display based on the determined route guidance. Determining route guidance may determine a route which reduced the overall wait time through the at least one traffic signal.

Further referring to FIG. 6, UE 315 may generate a graphical representation of the road infrastructure element(s), along with information associated with the road infrastructure data (Block 625). Such information may be associated with each road infrastructure element, and can be displayed in accordance with the icon(s) associated with each road infrastructure element. The information may include, for example, the state (e.g., color of traffic light 120-x), position, corresponding message (e.g., text and/or graphics associated with electronic sign 127), etc., of the road infrastructure element(s). The graphical representation may include a map of the proximity indicating the position and/or the state of the road infrastructure element(s). UE 315 may then provide the graphical representation generated in Block 625 to output device 440 (e.g., a display 140) (Block 630).

Figure 7:
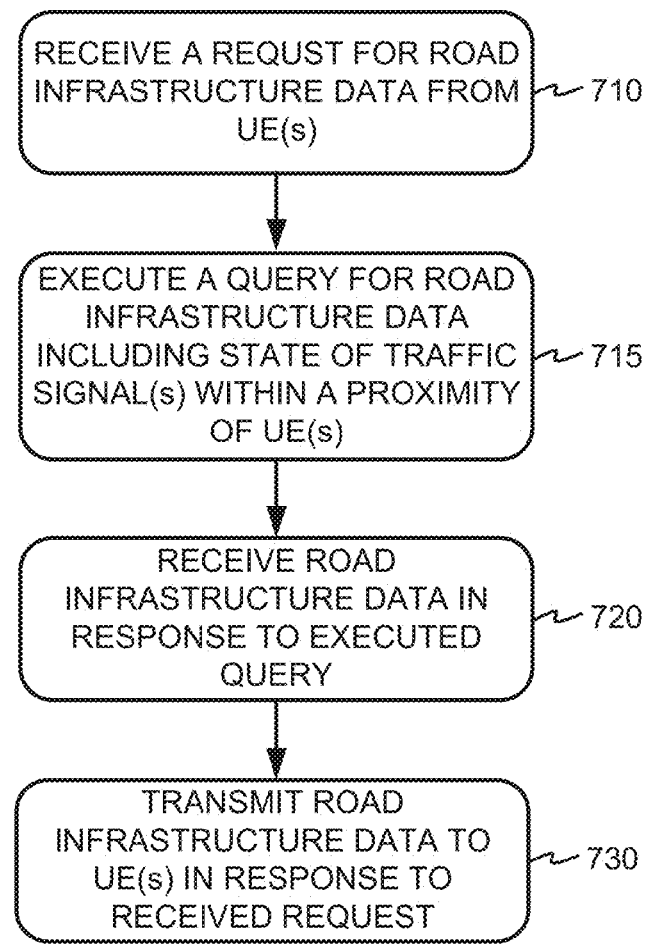
FIG. 7 is a flow chart showing an exemplary process for providing road infrastructure information.

FIG. 7 is a flow chart showing an exemplary process 700 for providing road infrastructure information. Process 700 may be performed by network element 500, which may include road infrastructure information provider(s) 225 and/or navigation information sourcing system 227.

Network element 500 may receive one or more requests for road infrastructure data from at least one UE 315 (Block 710). In an embodiment, navigation information sourcing system 227 may analyze and/or consolidate the received requests, which may include a position of vehicle 240, user credentials for a service, etc. Network element 500 may execute a query for road infrastructure data, which may include information associated with traffic infrastructure element(s), within predetermined proximities of one or more UEs 315 (Block 715). Network element 500 may receive the road infrastructure data in response to the executed query (Block 720). For example, network element 500 may obtain information from government traffic systems, etc. Network element 500 may then transmit the road infrastructure data to the at least one UE 315 in response to the received request(s) (Block 730). For example, the road infrastructure data may include traffic signal states, traffic signal timing, and/or the operational status of traffic signals. Road infrastructure data may also include information regarding in-road traffic sensors, electronic signage, toll-booth status, and/or traffic status derived from video cameras.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 6-7, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   determining a position of a User Equipment (UE);
   transmitting a request for road infrastructure data, wherein the request includes the position of the UE;
   receiving road infrastructure data associated with at least one road infrastructure element within a proximity of the UE;
   determining whether the at least one road infrastructure element lies beyond a line of sight of a driver associated with the UE;
   generating a graphical representation of the at least one road infrastructure element along with information associated with the road infrastructure data, wherein the information includes a position of the at least one road infrastructure element; and
   providing the graphical representation to a display, wherein the graphical representation includes an indication in response to determining that the at least one road infrastructure element lies beyond the line of sight of the driver.

2. The method of claim 1, wherein the transmitting further comprises:
   providing the request to at least one road infrastructure information provider or a navigation information sourcing system.

3. The method of claim 1, further comprising:
   transmitting periodic requests for road infrastructure data, wherein the periodic requests update the position of the UE; and
   receiving updates of road infrastructure data based on the updated positions of the UE.

4. The method of claim 1, further comprising:
   receiving crowd sourced navigation information which includes traffic and road condition status provided by a plurality of users over a wireless network.

5. The method of claim 1, wherein the receiving comprises receiving information regarding a state of at least one traffic signal; and wherein the generating the graphical representation comprises generating a map indicating a position and the state of the at least one traffic signal.

6. The method of claim 5, further comprising:
   receiving updates of road infrastructure data based on changes in the state of the at least one traffic signal within the proximity of the UE.

7. The method of claim 5, wherein the state of the at least one traffic signal comprises at least one of a signaling state, an operational state, or a traffic flow state.

8. The method of claim 5, wherein receiving road infrastructure data further comprises:
   receiving timing information regarding the state of the at least one traffic signal; and
   predicting future signaling states of the at least one traffic signal based on the timing information.

9. The method of claim 8, further comprising:
   determining a speed at which a vehicle associated with the UE is to travel to reduce wait time at the at least one traffic signal; and
   providing the speed on the display which associates the speed with the at least one traffic signal.

10. The method of claim 1, further comprising:
    determining route guidance based upon the road infrastructure data; and
    providing a preferred route to the display based on the route guidance.

11. The method of claim 10, wherein determining route guidance comprises:
    determining a route which reduces an overall wait time on at least one traffic signal.

12. A user equipment (UE), comprising:
    a wireless interface which communicates over a wireless channel;
    a position determination system configured to determine a position of the UE;
    a memory configured to store instructions; and
    a processor, coupled to the wireless interface, position determination system, and the memory, wherein the processor is configured to execute the instructions stored in the memory to:
       transmit a request for road infrastructure data, wherein the request includes the position of the UE,
       receive road infrastructure data associated with at least one road infrastructure element within a proximity of the UE,
       determine whether the at least one road infrastructure element lies beyond a line of sight of a driver associated with the UE,
       generate a graphical representation of the at least one road infrastructure element along with information associated with the road infrastructure data, wherein the information includes a position of the at least one road infrastructure element, and
       provide the graphical representation to a display, wherein the graphical representation includes an indication in response to determining that the at least one road infrastructure element lies beyond the line of sight of the driver.

13. The UE of claim 12, wherein the instructions to transmit further cause the processor to:
    provide the request to at least one road infrastructure information provider or a navigation information sourcing system.

14. The UE of claim 12, wherein the instructions further cause the processor to: transmit periodic requests for road infrastructure data, wherein the periodic requests update the position of the UE; and receive updates of road infrastructure data based on the updated positions of the UE.

15. The UE of claim 12, wherein the instructions further cause the processor to:

receive crowd sourced navigation information which includes traffic and road condition status provided by a plurality of users over a wireless network.

16. The UE of claim 12, wherein the instructions to receive road infrastructure data further cause the processor to:

receive timing information regarding a state of at least one traffic signal; and predict future signaling states of the at least one traffic signal based on the timing information.

17. The UE of claim 12, wherein the instructions further cause the processor to:

determine route guidance based upon the road infrastructure data; and provide a preferred route to the display based on the route guidance.

18. A method, comprising:

receiving, at a network element, a request for road infrastructure data from at least one User Equipment (UE);

executing a query for road infrastructure data, wherein the road infrastructure data is associated with at least one road infrastructure element within a proximity of the at least one UE, wherein a boundary the proximity exceeds a line of sight of a driver associated with the at least one UE;

receiving the road infrastructure data in response to the query, wherein the road infrastructure data includes a position of the at least one road infrastructure element to determine whether the at least one road infrastructure element lies beyond the line of sight of the driver; and transmitting the road infrastructure data to the at least one UE in response to the request.

19. The method of claim 1, wherein at least one of a size or shape of an area associated with the proximity automatically varies based on the speed of UE.

20. The method of claim 1, wherein at least one of a size or shape of an area associated the proximity automatically varies based on variations in geography.

* * * * *